US012768510B2

(12) United States Patent
Mimoun et al.

(10) Patent No.: US 12,768,510 B2
(45) Date of Patent: Oct. 20, 2026

(54) AUTOMOTIVE LIGHTING DEVICE AND AUTOMOTIVE VEHICLE

(71) Applicant: VALEO VISION, Bobigny (FR)

(72) Inventors: Mickael Mimoun, Bobigny (FR); Hafid El Idrissi, Bobigny (FR); Gregory Planche, Bobigny (FR); Pierre Renaud, Bobigny (FR)

(73) Assignee: Valeo Vision, Bobigny (FR)

( * ) Notice: Subject to any disclaimer, the term of this patent is extended or adjusted under 35 U.S.C. 154(b) by 34 days.

(21) Appl. No.: 18/721,689

(22) PCT Filed: Dec. 20, 2022

(86) PCT No.: PCT/EP2022/087013
§ 371 (c)(1),
(2) Date: Jun. 19, 2024

(87) PCT Pub. No.: WO2023/118158
PCT Pub. Date: Jun. 29, 2023

(65) Prior Publication Data

US 2025/0052397 A1 Feb. 13, 2025

(30) Foreign Application Priority Data

Dec. 21, 2021 (EP) .................................... 21216544

(51) Int. Cl.
*F21S 41/65* (2018.01)
*F21S 41/141* (2018.01)
(Continued)

(52) U.S. Cl.
CPC ............. *F21S 41/65* (2018.01); *F21S 41/141* (2018.01); *F21S 41/176* (2018.01); *F21S 41/25* (2018.01); *F21W 2103/55* (2018.01)

(58) Field of Classification Search
CPC ........ F21S 41/65; F21S 41/141; F21S 41/176; F21S 41/25; F21S 43/14; F21S 43/16;
(Continued)

(56) References Cited

U.S. PATENT DOCUMENTS

| | | | | |
|---|---|---|---|---|
| 8,767,215 | B2 * | 7/2014 | Cantin | G01S 17/10 356/447 |
| 9,140,971 | B2 * | 9/2015 | Woltman | H04N 9/3194 |

(Continued)

FOREIGN PATENT DOCUMENTS

| | | | |
|---|---|---|---|
| DE | 102013002668 | A1 | 8/2014 |
| DE | 102018113711 | A1 | 12/2019 |
| WO | 2020016435 | A1 | 1/2020 |

OTHER PUBLICATIONS

European Patent Office, International Search Report and Written Opinion of corresponding International Application No. PCT/EP2022/087013, dated May 30, 2023.

*Primary Examiner* — Thien M Le
*Assistant Examiner* — Asifa Habib
(74) *Attorney, Agent, or Firm* — Valeo Vision

(57) ABSTRACT

The present invention refers to an automotive lighting device with a first solid-state light source configured to emit light in a first wavelength intended to contribute to a first luminous function, a second solid-state light source configured to emit light in a second wavelength different from the first wavelength, the second solid-state light source being intended to contribute a second luminous function, an optical element intended to project the light of the first solid-state light source, a luminous sensor configured to acquire a portion of a reflection of the light projected by the optical element in the first wavelength and processing means configured to control the operation of the light sources and to receive data from the luminous sensor.

9 Claims, 1 Drawing Sheet

(51) Int. Cl.

| | |
|---|---|
| ***F21S 41/176*** | (2018.01) |
| ***F21S 41/25*** | (2018.01) |
| ***F21W 103/55*** | (2018.01) |

(58) Field of Classification Search

CPC ........... F21W 2103/55; F21W 2103/10; B60Q 2400/30; B60Q 1/0023; G01S 7/4814; G01S 17/931

See application file for complete search history.

(56) References Cited

U.S. PATENT DOCUMENTS

| | | | | |
|---|---|---|---|---|
| 10,222,474 | B1 * | 3/2019 | Raring | H01S 5/02212 |
| 11,603,031 | B2 * | 3/2023 | Sorg | B60Q 1/0023 |
| 2011/0280032 | A1 * | 11/2011 | Kishimoto | B82Y 20/00<br>362/538 |
| 2013/0314711 | A1 * | 11/2013 | Cantin | B60Q 1/0023<br>356/445 |
| 2020/0064476 | A1 * | 2/2020 | Raring | H01S 5/02325 |
| 2020/0207258 | A1 * | 7/2020 | Tezuka | F21S 41/143 |
| 2020/0209385 | A1 * | 7/2020 | Tezuka | B60Q 1/0023 |
| 2020/0254924 | A1 * | 8/2020 | Sawonski | B60Q 1/28 |
| 2022/0030684 | A1 * | 1/2022 | Ichikawa | B60Q 1/507 |
| 2022/0090752 | A1 * | 3/2022 | Kosugi | F21S 41/143 |
| 2022/0349544 | A1 * | 11/2022 | Yamamoto | B60Q 1/0058 |
| 2025/0052397 | A1 * | 2/2025 | Mimoun | F21S 41/141 |

* cited by examiner

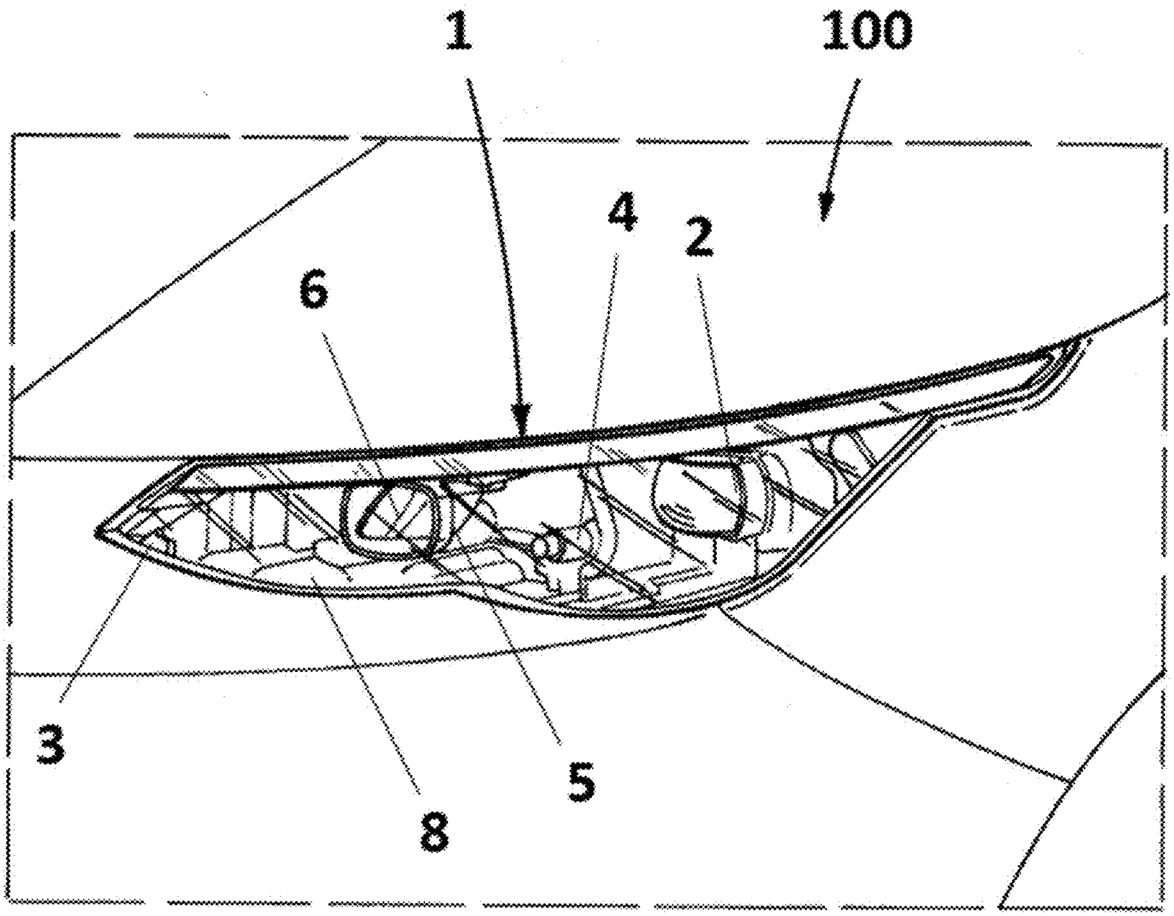
1
100
4
2
6
3
5
8

AUTOMOTIVE LIGHTING DEVICE AND AUTOMOTIVE VEHICLE

TECHNICAL FIELD

This invention is related to the field of automotive lighting devices, and more particularly, to the ones used to detect objects surrounding the vehicle

BACKGROUND OF THE INVENTION

Driving assistance comprises the use of sensors to inform the driver (or to directly inform the vehicle) of objects surrounding the vehicle. This is extremely useful for autonomous driving, but also to help a potential driver to avoid obstacles on the road, in the case of low visibility conditions (due to weather conditions, deficient lighting surrounding the vehicles or the vehicle going reverse, for example).

To achieve this goal, sensors play a crucial role, since they receive the information from the exterior of the vehicle, containing the data that will be interpreted in order to create a map of the surrounding objects.

There are many different sensors which are intended to accomplish this mission. Most of them use ultrasound, with acoustic pulses. Cameras are also adapted to acquire infrared or visible ambient light.

In some cases, when this is implemented in an existing lighting device, the light emitted by other lighting functions may perturb the reception of the luminous sensor. A way to avoid this perturbation is therefore sought.

SUMMARY OF THE INVENTION

The present invention provides an alternative solution for the problem of by means of an automotive lighting device which comprises

- A first light source configured to emit light with a first peak wavelength intended to contribute to a first lighting function;
- At least a second light source configured to emit light with at least a second peak wavelength different from the first wavelength, the at least one second light source being intended to contribute to at least a second lighting function;
- At least an optical element intended to project the light of the first light source;
- at least one luminous sensor configured to acquire a portion of a reflection of the light projected by the optical element in a wavelength comprised between 0.9 and 1.1 times the first peak wavelength; and
- processing means configured to control the operation of the light sources and to receive data from the luminous sensors.

This lighting device uses the light emitted by the light sources which are in charge of the driving lighting or signaling functions in order to obtain information about the surrounding objects. There is therefore no need to use an additional light source, or ultrasound devices. The same device which may be used for lighting functions (such as a Low Beam LB, a High Beam HB, a Daytime Running Light DRL, a Position Light PL, a Stop Light, a Reverse Light, a Corner Light CL, or a Turn Indicator TI) may also be used for objects detecting. Further, the same lighting device may be used for further lighting functions. To avoid that these further lighting functions interfere in the detection of the light by the luminous sensor, the main function, the reflection of which is intended to be captured by the luminous sensor, emits light in a wavelength which is different from the light emitted by the other light sources. Hence, since the luminous sensor detects light in this first wavelength, the light reflected from the other functionalities is not detected by the luminous sensor, so it does not become an interference.

In some particular embodiments, the light sources are solid-state light sources.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In some particular embodiments, the first wavelength is comprised between 475 nm and 500 nm.

This range is not dangerous for human eye, since it avoids the most dangerous range, which is below 475 nm. With the first light source emitting in this wavelength, eye safety of the pedestrians and other living beings illuminated by it.

In some particular embodiments, the first wavelength is is comprised between 485 nm and 495 nm.

This peak value corresponds to turquoise light, which is used in autonomous driving.

In some particular embodiments, the first light source comprises a phosphor configured to add a wavelength peak so that the light emitted by the first light source is white.

In some particular embodiments, the lighting device further comprises a third and/or a fourth light sources intended to contribute to a third and/or a fourth lighting function.

The lighting device may be in charge of different lighting and signaling functions, and only one of these functions may be used together with the luminous sensor for the detection of outer objects.

In some particular embodiments, the first lighting function is daytime running light or front-position light.

These functions, since they are front lighting functions and are usually active while the vehicle is being used, are especially suitable for the object detection.

In some particular embodiments, the at least one second lighting function comprises one of passing-beam headlamp function and driving-beam headlamp function.

These additional lighting functions are usually present in the automotive lighting devices.

In some particular embodiments, the solid-state light sources comprise light emitting diodes or laser diodes.

These types of light sources are widely used in automotive vehicles for driving lighting and signaling. With the present invention, the same light sources may also be used for objects detection.

In a second inventive aspect, the invention provides an automotive vehicle comprising an automotive lighting device according to the first inventive aspect.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

BRIEF DESCRIPTION OF DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a general perspective view of an automotive lighting device according to the invention installed in an automotive vehicle.

DETAILED DESCRIPTION OF THE INVENTION

In this figure, the following reference numbers are used for each of the following elements:

1 Headlamp
2 First group of LEDs
3 Processing unit
4 Photodiode
5 Second group of LEDs
6 Third group of LEDs
8 Outer lens
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows an automotive lighting device 1 according to the invention installed in an automotive vehicle 100.

In this figure, the following elements are seen

- a first group of LEDs 2 configured to emit light with a first peak wavelength intended to contribute to daytime running lamp function;
- a second group of LEDs 5 configured to emit light with a second peak wavelength different from the first peak wavelength, the second group of LEDs being intended to contribute to a passing-beam headlamp function;
- a third group of LEDs 6 configured to emit light with the second peak wavelength, the third group of LEDs being intended to contribute to a driving-beam headlamp function;
- an outer lens 8 intended to project the light of the first group of LEDs 2;
- a photodiode 4 configured to acquire a portion of a reflection of the light projected by the optical element in the first peak wavelength; and
- a processing unit 3 configured to control the operation of the LEDs 2, 5, 6 and to receive data from the photodiode 4.

The outer lens 8 projects light emitted by the first group of LEDs 2 outside the lighting device 1, and this light is reflected by outer objects and captured by the photodiode 4, which sends the information about captured light to the processing unit 3 so that these outer objects are detected. The processing unit 3 is furthermore configured to receive power from a power source and prepare the frequency and shape of the light to be emitted by the first group of LEDs 2.

However, the light emitted by the other groups of LEDs 5, 6 and reflected by the outer objects (or by the outer lens itself) may disturb the measurements of the photodiode 4. For this reason, the first group of LEDs emit light which comprises a unique wavelength peak, which is the wavelength recognized by the photodiode 4.

This first wavelength peak may be the one used by turquoise lights, around 490 nm. This value is safe for the eye protection of living beings surrounding the vehicle. The other LED groups 5, 6, intended to carry out other lighting functionalities, operate in a different wavelength, such as 440 nm.

This value of the first wavelength peak is compensated by a dedicated phosphor included in the first light sources, which provides a second peak so that the light emitted by the first light sources is white.

This invention may be used in a matrix configuration such as a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometer.

The monolithic matrix is coupled to the control center so as to control the generation and/or the projection of a pixelated light beam by the matrix arrangement. The control center is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

What is claimed is:

1. An automotive lighting device comprising:

a first light source configured to emit light with a first peak wavelength intended to contribute to a first lighting function, with the first light source including at least a first light emitting diode;

at least a second light source configured to emit light with at least a second peak wavelength different from the first peak wavelength, the at least one second light source contributing to at least a second lighting function, with the second light source including at least a second light emitting diode;

a third light source contributing to a third lighting function, with the third light source including at least a third light emitting diode;

at least an optical element to project the light of the first light source;

at least one luminous sensor configured to acquire a portion of a reflection of the light projected by the optical element in a wavelength comprised between 0.9 and 1.1 times the first peak wavelength; and a processing unit configured to control the operation of the light sources and to receive data from the luminous sensor.

2. The automotive lighting device according to claim 1, wherein the first peak wavelength is comprised between 470 nm and 500 nm.

3. The automotive lighting device according to claim 1, wherein the first peak wavelength is comprised between 485 and 495 nm.

4. The automotive lighting device according to claim 2, wherein the first light source includes a phosphor configured to add a wavelength peak so that the light emitted by the first light source is white.

5. The automotive lighting device according to claim 1, wherein the first lighting function is daytime running light or front-position light.

6. The automotive lighting device according to claim 1, wherein the at least one second lighting function comprises one of passing-beam headlamp function and driving-beam headlamp function.

7. The automotive lighting device according to claim 1, further comprising a fourth light source contributing to a fourth lighting function.

8. The automotive lighting device according to claim 1, wherein the at least a first light emitting diode includes a laser diode.

9. An automotive vehicle comprising an automotive lighting device including:

a first light source configured to emit light with a first peak wavelength intended to contribute to a first lighting function, with the first light source including at least a first light emitting diode;

at least a second light source configured to emit light with at least a second peak wavelength different from the first peak wavelength, the at least one second light source contributing to at least a second lighting function, with the second light source including at least a second light emitting diode;

a third light source contributing to a third lighting function, with the third light source including at least a third light emitting diode;

at least an optical element to project the light of the first light source;

at least one luminous sensor configured to acquire a portion of a reflection of the light projected by the optical element in a wavelength comprised between 0.9 and 1.1 times the first peak wavelength; and a processing unit configured to control the operation of the light sources and to receive data from the luminous sensor.

* * * * *